(No Model.)
S. LUTHER.
Straw Cutter.
No. 237,402.   Patented Feb. 8, 1881.
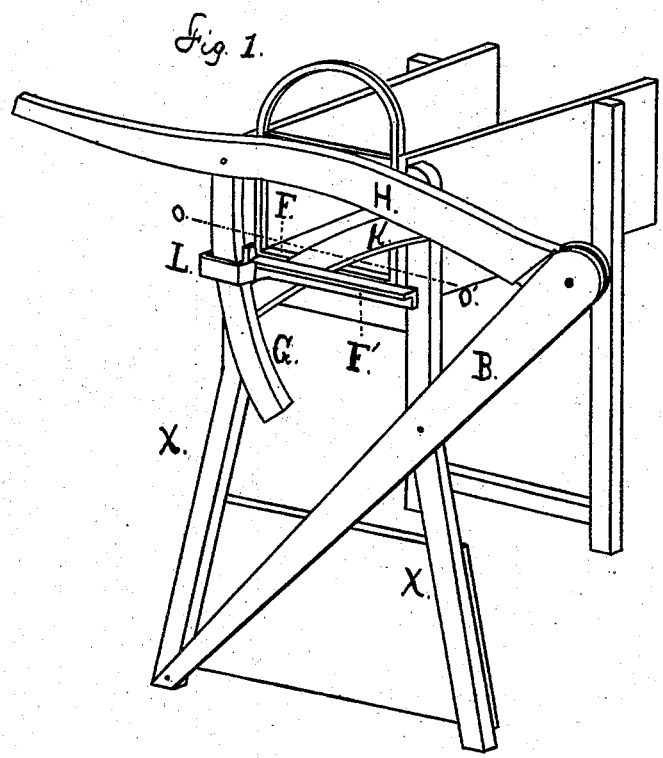
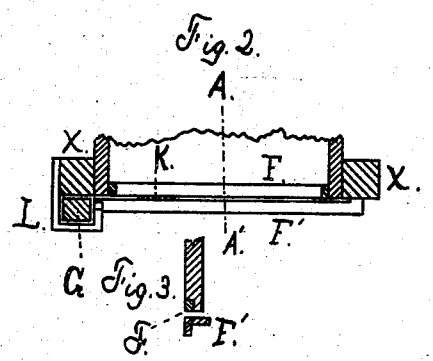
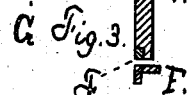
Witnesses.
Edward A. Renwick.
M. B. Aspinwall.
Inventor.
Sylvester Luther.
Edward Taggart.
Attorney.

UNITED STATES PATENT OFFICE.

SYLVESTER LUTHER, OF GRAND RAPIDS, MICHIGAN.

STRAW-CUTTER.

SPECIFICATION forming part of Letters Patent No. 237,402, dated February 8, 1881.

Application filed June 30, 1880. (No model.)

*To all whom it may concern:*

Be it known that I, SYLVESTER LUTHER, of the city of Grand Rapids, in the county of Kent and State of Michigan, have invented certain new and useful Improvements in Straw-Cutters, of which the following is a specification.

My invention relates to improvements in that class of straw-cutters in which the feed is cut by a single knife which has a vertical motion, and is usually attached to a lever, which acts as a handle for the knife; and the object of my invention is to so combine the knife and hand-lever with a fixed loop-guide and curved guide-arm that the knife shall operate with a shear-cut and be guided independently of the feed-supports. I attain this object by the mechanism illustrated in the accompanying drawings, in which—

Figure 1 is a perspective view of a cutting-box constructed in accordance with my invention, and Fig. 2 is a broken top view of the feed-support and a horizontal sectional view of the two front legs of the cutting-box on the plane of the upper surface of the bottom of the hopper, indicated in Fig. 1 by the dotted line *o o*. Fig. 3 is a section on dotted line A A', Fig. 2.

In Fig. 1, X X represent the legs of the cutting-box.

B is a brace, attached to one of the legs X at its lower end and to the other leg at a point near its middle, the upper end of the brace B forming a bearing or fulcrum for the handle or lever H.

To the handle H is attached a knife-guide, G, a sectional view of which is shown in Fig. 2. The guide G passes through the loop L, as shown, and is attached firmly to the handle H and to the knife K, as shown fully in Fig. 1. The knife K is attached to the guide G and handle H in the position shown, so as to give a drawing cut on the feed operated upon.

F is one of the feed-supports. It passes horizontally across the bottom of the hopper, having its upper surface on a plane with the upper surface of the bottom of the hopper, and may pass up around in the form shown in Fig. 1. This feed-support may be made of a single piece of metal attached to the hopper, or in any desired form and of any suitable material.

F' is the outer feed-support, which should be made preferably of metal. Its construction is fully shown in Fig. 2. It may be made of iron or any other suitable material, bent around so as to form the loop L for the guide G, in which case the bent end of the support F' is fastened to the outside of the leg X of the cutting-box. This arrangement allows the knife to be lifted clear above the feed, while the guide G projects through the loop L, holding the knife firmly in position.

The guide G may be made in any form to suit taste or convenience, and the feed-support F' may be made in different forms and differently attached, it being held so that its upper surface is in a plane with the upper surface of the bottom of the hopper; but from my experience I have found the construction herein described preferable to any other.

Having thus described my invention, what I claim to have invented, and desire to secure by Letters Patent, is—

The combination, substantially as before set forth, of the hand-lever, the curved guide-arm, the knife extending obliquely or diagonally across from the hand-lever to the guide-arm, and the loop-guide.

SYLVESTER LUTHER.

Witnesses:
 EDWARD TAGGART,
 ARTHUR C. DENISON.